No. 838,948. PATENTED DEC. 18, 1906.
G. BRYAR.
FRICTIONAL LOCK NUT FOR BOLTS.
APPLICATION FILED FEB. 12, 1906.
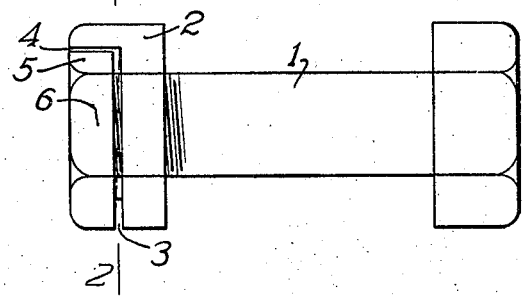
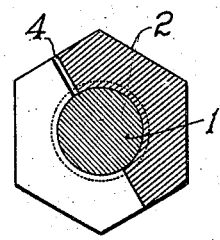
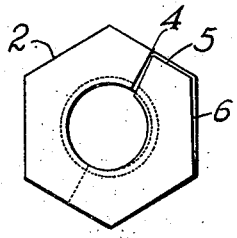 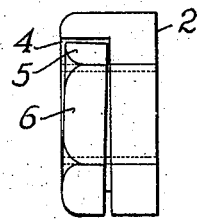

UNITED STATES PATENT OFFICE.

GEORGE BRYAR, OF BOSTON, MASSACHUSETTS, ASSIGNOR, BY DIRECT AND MESNE ASSIGNMENTS, OF SEVEN-EIGHTHS TO JOHN M. SMITH, OF ST. JOHNS, CANADA.

FRICTIONAL LOCK-NUT FOR BOLTS.

No. 838,948.      Specification of Letters Patent.      Patented Dec. 18, 1906.

Application filed February 12, 1906. Serial No. 300,786.

*To all whom it may concern:*

Be it known that I, GEORGE BRYAR, a citizen of the United States, and a resident of Boston, county of Suffolk, and State of Massachusetts, have invented certain new and useful Improvements in Frictional Lock-Nuts for Bolts, of which the following is a specification, reference being had to the drawings accompanying the same.

My invention relates to lock-nuts for bolts wherein the nut is so formed as to produce a holding friction between the threads of the nut and the threads of the bolt sufficient to prevent the nut from becoming loose by shock or jar of the structure in which the bolt is mounted.

The object of my invention is to so construct a nut for a bolt that its threads will have sufficient frictional grip upon the threads of the bolt to prevent its becoming loose and without producing sufficient friction to result in abrasion of the threads on the bolt and nut.

In the drawings accompanying this specification, Figure 1 represents a bolt having my frictional lock-nut mounted thereon. Fig. 2 is a sectional plan view of a nut and the bolt to which it is attached. Fig. 3 represents a plan view of my improved lock-nut removed from the bolt and shows the manner in which the body portion is bent inward to produce the frictional grip. Fig. 4 is a side elevation of a modified form of nut, showing the part bent inward to produce a frictional grip.

Referring to the drawings, 1 denotes a bolt which is threaded at one end, and 2 denotes the improved lock-nut. This improved lock-nut is formed by slitting a nut transversely to its center, or thereabout, to form a slit 3 and also preferably by slitting the same longitudinally, as at 4, inward from the outer face of the nut to the slit 3, said slit 4 being formed at one end of the slit 3. The nut 2 is tapped or internally threaded previous to being slitted, and by thus cutting or slitting the nut as just described a loose wing or finger 5 6 is formed. The free end of the said wing or finger is then slightly bent inward radially, as shown in Fig. 3, to cause the same to bind on the threaded portion of a bolt radially, and the free end of the said wing or finger is also slightly bent inward longitudinally of the nut and bolt, as shown in Fig. 4, so as to bring the threads on the free threaded portion of said wing or finger somewhat out of register with the threads on the adjacent threaded portion of said nut, and thus cause the said finger to frictionally engage the threads of the bolt in the direction of the length of the latter, as well as radially of the bolt, so as to firmly grip the same, and thereby prevent the nut from working loose by the combined gripping effect resulting from the radial displacement of the free end of said finger, as also by the displacement thereof longitudinally of the nut and the bolt.

The wing or finger formed by slitting the nut transversely and bent inward longitudinally of the nut, as shown and described, will be somewhat inclined, so that while the internal threads at the base or connected end of the said wing or finger will be in register with the adjacent communicating parts of the threads the displaced portion will be so inclined that when the nut is screwed into place on the bolt the displaced wing or finger, while still gripping the threaded portion of the bolt strongly, will be forced to resume or nearly resume its original or normal position, as will be understood from Fig. 1, while at the same time this displaced portion of the wing or finger will grip the bolt with sufficient force to effectively lock the nut and prevent accidental displacement thereof. This gripping effect will, however, not be so great as to prevent the nut from being readily screwed into place by a suitable wrench.

Owing to the considerable length of the wing or finger 5 6, it will have sufficient elasticity, so that the nut may be used repeatedly, if necessary, as when the nut is removed from the bolt the gripping wing or finger will resume nearly or quite its original displaced position, as shown in Figs. 3 and 4.

Having thus described my invention, I claim and desire to secure by Letters Patent—

A frictional lock-nut having an internally-threaded hole, a transverse slit and a longitudinal slit extending from one end of said nut to said transverse slit, at one end of the latter, said slits forming a wing or finger, and said wing or finger being slightly bent inward radially and being also bent inward toward said transverse slit longitudinally of the nut, thereby displacing a portion of said internally-threaded finger, both radially and longitudinally of the nut, to afford a radial and longitudinal frictional grip on a threaded portion of a bolt.

In testimony whereof I have hereunto set my hand, in the presence of two subscribing witnesses, this the 24th day of January, A. D. 1906.

GEORGE BRYAR.

Witnesses:
R. P. ELLIOTT,
H. M. KELSO.